(12) United States Patent
McIlvain et al.

(10) Patent No.: US 8,297,979 B2
(45) Date of Patent: Oct. 30, 2012

(54) ELECTRONIC LEARNING DEVICE WITH A GRAPHIC USER INTERFACE FOR INTERACTIVE WRITING

(75) Inventors: Scott H. McIlvain, Holland, NY (US); Brian Aiken, East Aurora, NY (US)

(73) Assignee: Mattel, Inc., El Segundo, CA (US)

( * ) Notice: Subject to any disclaimer, the term of this patent is extended or adjusted under 35 U.S.C. 154(b) by 1445 days.

(21) Appl. No.: 11/569,072

(22) PCT Filed: May 27, 2005

(86) PCT No.: PCT/US2005/018653
§ 371 (c)(1),
(2), (4) Date: Aug. 15, 2007

(87) PCT Pub. No.: WO2005/119628
PCT Pub. Date: Dec. 15, 2005

(65) Prior Publication Data
US 2007/0298387 A1    Dec. 27, 2007

Related U.S. Application Data

(60) Provisional application No. 60/575,962, filed on Jun. 1, 2004, provisional application No. 60/614,109, filed on Sep. 29, 2004.

(51) Int. Cl.
*G09B 11/04* (2006.01)
(52) U.S. Cl. ........ 434/163; 434/161; 434/162; 434/164; 434/165
(58) Field of Classification Search ........... 434/161–165
See application file for complete search history.

(56) References Cited

U.S. PATENT DOCUMENTS
3,662,077 A    5/1972    Kersten
(Continued)

FOREIGN PATENT DOCUMENTS
EP    645731 A1    3/1995
(Continued)

OTHER PUBLICATIONS

Supplementary European Search Report Issued Apr. 19, 2010 in EP Application No. 05753836.5, 3 pages.

(Continued)

*Primary Examiner* — Xuan Thai
*Assistant Examiner* — Alvin Carlos
(74) *Attorney, Agent, or Firm* — Panitch Schwarze Belisario & Nadel LLP

(57) ABSTRACT

An interactive electronic device (10, 100) is disclosed. The device (10, 100) has a sequence of language symbols (18) and control electronics (16) operatively coupled to a graphic user interface (14) and a language-symbol selector (20, 20') having a sight (22, 22'). The sequence of language symbols (18) and the language-symbol selector (20, 20') are movable in relation to one another such that each language symbols of the sequence is viewable in the sight (22, 22'). The control electronics (16) has an electronic memory (30) having stored therein a plurality of traceable templates (32) representing each language-symbol of the sequence (18). Selection of a language symbol when the language symbol is viewable in the sight (22, 22') causes the graphic user interface (14) to produce the traceable template (32) corresponding to the language symbol and to produce a visible rendering (34) of a movement of an affector (36) as the affector (36) races the traceable template (32).

16 Claims, 7 Drawing Sheets

U.S. PATENT DOCUMENTS

| | | | |
|---|---|---|---|
| 3,696,529 A | 10/1972 | Mabbutt | |
| 3,747,846 A | 7/1973 | Long | |
| 4,143,472 A | 3/1979 | Murata et al. | |
| 4,288,936 A | 9/1981 | Okutsu | |
| 4,643,680 A | 2/1987 | Hill | |
| 4,669,984 A | 6/1987 | Jones et al. | |
| 4,675,476 A | 6/1987 | Kobayashi | |
| 4,793,810 A | 12/1988 | Beasley, Jr. | |
| 4,972,496 A | 11/1990 | Sklarew | |
| 5,063,600 A | 11/1991 | Norwood | |
| 5,157,737 A | 10/1992 | Sklarew | |
| 5,176,520 A | 1/1993 | Hamilton | |
| 5,186,631 A | 2/1993 | Okutsu | |
| RE34,476 E | 12/1993 | Norwood | |
| 5,382,188 A * | 1/1995 | Tomellini | 446/397 |
| 5,389,745 A | 2/1995 | Sakamoto | |
| 5,428,805 A | 6/1995 | Morgan | |
| 5,478,084 A | 12/1995 | Itkis | |
| 5,484,288 A | 1/1996 | DelGigante | |
| 5,559,897 A | 9/1996 | Brown et al. | |
| 5,596,656 A | 1/1997 | Goldberg | |
| 5,596,698 A | 1/1997 | Morgan | |
| 5,655,136 A | 8/1997 | Morgan | |
| 5,730,602 A | 3/1998 | Gierhart et al. | |
| 5,820,385 A * | 10/1998 | Ohashi et al. | 434/409 |
| 5,997,309 A | 12/1999 | Metheny et al. | |
| 6,017,260 A * | 1/2000 | Dolan | 446/298 |
| 6,053,741 A | 4/2000 | Wood | |
| 6,054,990 A | 4/2000 | Tran | |
| 6,092,294 A | 7/2000 | Mak | |
| 6,104,388 A | 8/2000 | Nagai et al. | |
| 6,111,976 A | 8/2000 | Rylander | |
| 6,128,007 A | 10/2000 | Seybold | |
| 6,142,784 A * | 11/2000 | Wood | 434/201 |
| 6,146,146 A | 11/2000 | Koby-Olson | |
| 6,164,976 A | 12/2000 | Wilson | |
| 6,196,848 B1 * | 3/2001 | Yamazaki | 434/409 |
| 6,215,901 B1 | 4/2001 | Schwartz | |
| 6,315,573 B1 | 11/2001 | Hirota et al. | |
| 6,358,059 B1 | 3/2002 | Li | |
| 6,415,256 B1 | 7/2002 | Ditzik | |
| 6,442,578 B1 | 8/2002 | Forcier | |
| 6,504,956 B1 | 1/2003 | Gannage et al. | |
| 6,517,355 B1 | 2/2003 | Long et al. | |
| 6,535,204 B2 | 3/2003 | Sun | |
| 6,546,134 B1 | 4/2003 | Shrairman et al. | |
| 6,647,145 B1 | 11/2003 | Gay | |
| 6,648,647 B2 * | 11/2003 | Wood et al. | 434/174 |
| 6,661,409 B2 | 12/2003 | Demartines et al. | |
| 6,707,942 B1 | 3/2004 | Cortopassi et al. | |
| 6,722,891 B1 | 4/2004 | Ma | |
| 6,724,375 B2 | 4/2004 | Wu et al. | |
| 6,755,656 B2 | 6/2004 | Jelinek et al. | |
| 6,758,674 B2 | 7/2004 | Lee | |
| 6,802,717 B2 * | 10/2004 | Castro | 434/169 |
| 6,805,559 B2 | 10/2004 | Mak | |
| 7,103,309 B1 * | 9/2006 | Motosko | 434/308 |
| 7,249,950 B2 * | 7/2007 | Freeman et al. | 434/155 |
| 2001/0000026 A1 | 3/2001 | Skoog | |
| 2002/0040817 A1 | 4/2002 | LeKuch et al. | |
| 2002/0093501 A1 | 7/2002 | Lui et al. | |
| 2002/0111540 A1 | 8/2002 | Schmidt et al. | |
| 2002/0142270 A1 * | 10/2002 | Furry | 434/159 |
| 2002/0160342 A1 | 10/2002 | Castro | |
| 2002/0197589 A1 | 12/2002 | Wood et al. | |
| 2003/0003427 A1 * | 1/2003 | Wood et al. | 434/174 |
| 2003/0007018 A1 | 1/2003 | Seni et al. | |
| 2003/0016873 A1 | 1/2003 | Nagel et al. | |
| 2003/0036048 A1 | 2/2003 | Gaster | |
| 2003/0038788 A1 | 2/2003 | Demartines et al. | |
| 2003/0067465 A1 | 4/2003 | Jelinek et al. | |
| 2003/0071850 A1 | 4/2003 | Geidl | |
| 2003/0080948 A1 | 5/2003 | Lapstun et al. | |
| 2003/0090463 A1 | 5/2003 | Lapstun et al. | |
| 2003/0090477 A1 | 5/2003 | Lapstun et al. | |
| 2003/0117378 A1 | 6/2003 | Carro | |
| 2003/0134257 A1 | 7/2003 | Morsy et al. | |
| 2003/0162151 A1 | 8/2003 | Berling et al. | |
| 2003/0162152 A1 | 8/2003 | Lee | |
| 2003/0162162 A1 | 8/2003 | Marggraff | |
| 2003/0214540 A1 | 11/2003 | Huapaya et al. | |
| 2004/0008222 A1 | 1/2004 | Hovatter et al. | |
| 2004/0058304 A1 | 3/2004 | Morsy et al. | |
| 2004/0070573 A1 | 4/2004 | Graham | |
| 2004/0121298 A1 | 6/2004 | Creamer et al. | |
| 2004/0197743 A1 | 10/2004 | Olsen et al. | |
| 2004/0231496 A1 * | 11/2004 | Schwartz | 84/615 |
| 2005/0011378 A1 | 1/2005 | Shuler et al. | |
| 2006/0050061 A1 * | 3/2006 | Aiken et al. | 345/173 |

FOREIGN PATENT DOCUMENTS

| | | |
|---|---|---|
| EP | 980038 A2 | 2/2000 |
| GB | 2150730 A | 7/1985 |

OTHER PUBLICATIONS

Office Action Issued Mar. 12, 2009 in AU Application No. 2005251170, 2 pages.

* cited by examiner

ELECTRONIC LEARNING DEVICE WITH A GRAPHIC USER INTERFACE FOR INTERACTIVE WRITING

CROSS-REFERENCE TO RELATED APPLICATIONS

This application is a Section 371 of International Application No. PCT/US05/018653 (International Publication Number WO 2005/119628 A1) filed May 27, 2005, which claims priority to U.S. Provisional Patent Application No. 60/575,962, filed Jun. 1, 2004 entitled "An Electronic Learning System With A Graphic User Interface For Interactive Writing" and U.S. Provisional Patent Application No. 60/614,109, filed Sep. 29, 2004 entitled "An Electronic Learning System With A Graphic User Interface For Interactive Writing" and claims the earlier filing dates of the provisional applications. Each of the above-identified related applications is incorporated herein by reference.

BACKGROUND OF THE INVENTION

The present invention relates to a system for teaching writing. More particularly, the present invention relates to an electronic learning device with a graphic user interface for interactive writing.

A first step and fundamental part of mastering the art of handwriting is the learning and forming of language symbols. Conventional methods for teaching the handwriting of language symbols are typical based upon repeatedly exposing a student to the predictable, distinctive, and constant features comprising each language symbol. Emphasis usually is placed upon identifying the shape and direction of construction of the strokes forming each language symbol.

Language symbol templates play an important role in the process of learning handwriting. The templates serve as representative examples of the language symbols of interest and may include specific information regarding the nature, direction and order of the strokes that must be made to produce the language symbol. By repeatedly attempting to reproduce the language symbol represented by the template either by tracing the template or by producing a freehand rendering of the template, learning to handwrite the language symbol is achieved.

Due to the repetitive nature in the process of learning handwriting and to the continual need for the student to receive constructive feedback and encouragement, significant time demands are be placed on the instructor interacting with the student. Further, to maintain the student's interest until the handwriting of the language symbols has been mastered, the interaction should be varied in scope and presentation and include amusement and entertainment aspects.

Accordingly, there is a need in the art for an interactive, finger or stylus based, electronic learning device that allows a child to learn to write language symbols by tracing with a finger or stylus language symbols produced by the writing device and that additionally may provide for a child's amusement an interactive drawing experience.

BRIEF SUMMARY OF THE INVENTION

Briefly stated, one embodiment of the present invention is directed to an interactive electronic device comprising a sequence of language symbols, a language-symbol selector, a graphic user interface, and control electronics. The language-symbol selector has a sight. The sequence of language symbols and the language-symbol selector are movable in relation to one another such that each language symbols of the sequence of language symbols is viewable in the sight. The control electronics comprises an electronic memory having stored therein a plurality of traceable templates. Each traceable template represents one language symbol of the sequence of language-symbol. The control electronics is operatively coupled to the language-symbol selector and to the graphic user interface. Selection of the one language symbol of the sequence of language-symbol when the one language symbol is viewable in the sight causes the graphic user interface to produce the traceable template corresponding to the one language symbol and to produce a visible rendering of a movement of an affector as the affector traces the traceable template.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings:

FIGS. 7a, 7b, and 7c are schematic representations of a critical point template, a percent area template and a percent area with critical points template for the rendering analyzer of the electronic learning device of FIG. 1.

DETAILED DESCRIPTION OF THE INVENTION

Figure 1:
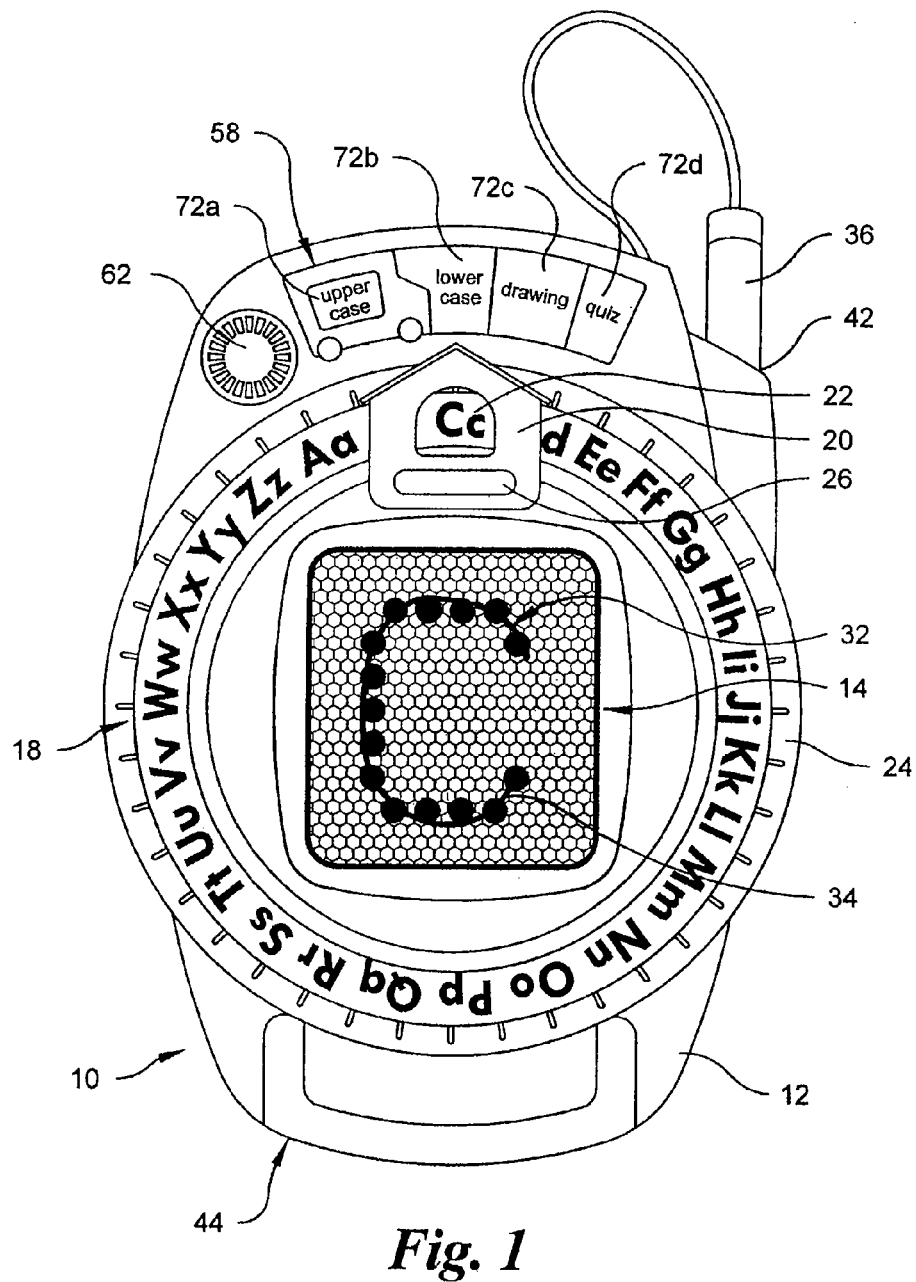
FIG. 1 is a top plan view of a first preferred embodiment of an electronic learning device in accordance with the present invention.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of electronic learning device, and designated parts thereof. The terminology includes the words noted above, derivatives thereof and words of similar import.

Figure 2:
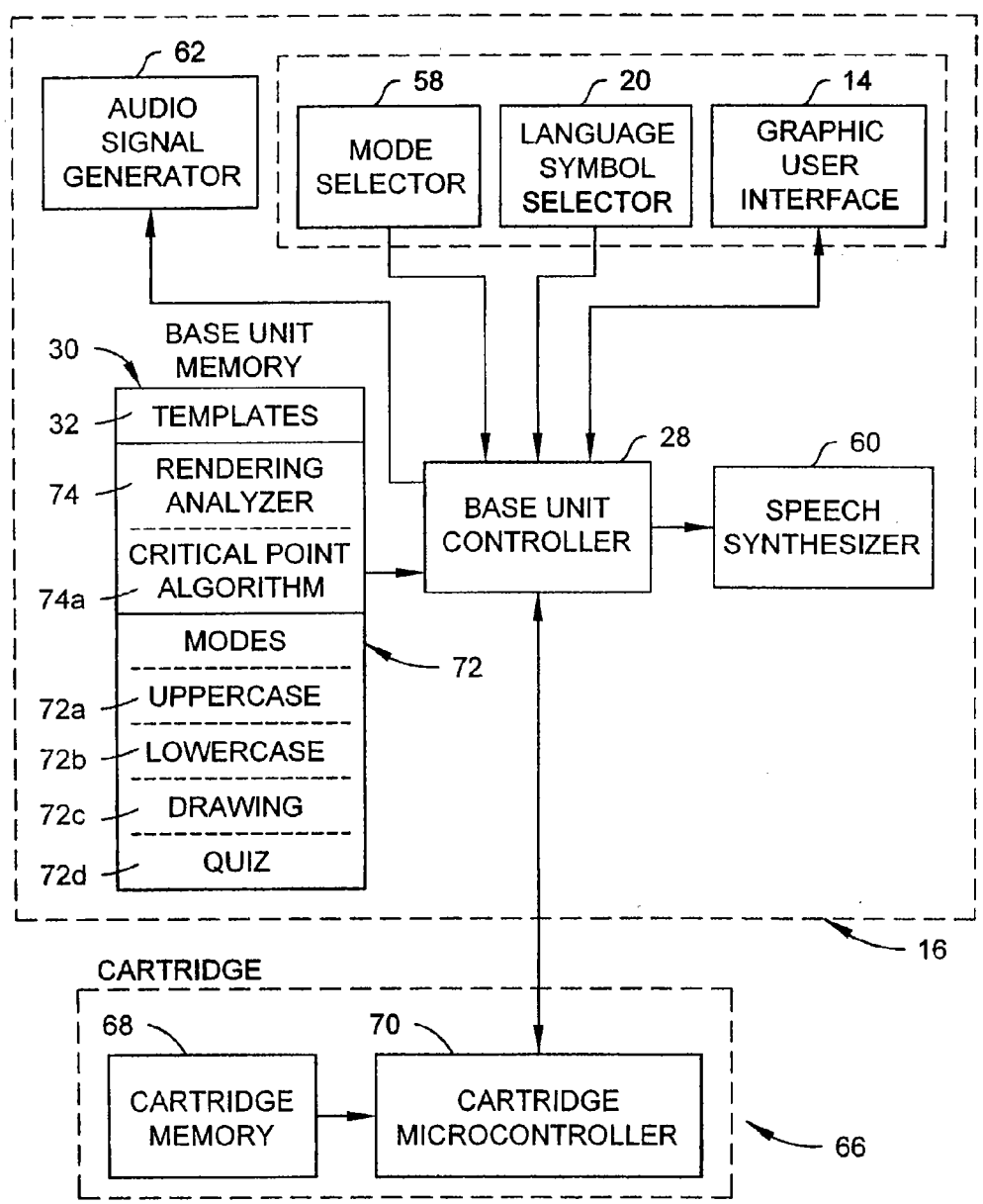
FIG. 2 is a block diagram for the electronic learning device of FIG. 1.

Referring to the drawings in detail, where like numerals indicate like elements throughout, there is shown in FIGS. 1-2 a first preferred embodiment of the electronic learning device with a graphic user interface for interactive writing, generally designated 10, and hereinafter referred to as the "writing device" 10 in accordance with the present invention. The writing device 10 is an interactive, finger or stylus based, electronic learning and amusement system that allows a child to learn to write letters or numbers by tracing with a finger or stylus language symbols produced by the writing device 10 as further discussed below. The writing device 10 additionally may provide an interactive drawing experience by producing graphic templates for tracing or, alternatively, may provide for free style drawing without a template.

The writing device 10 comprises a base unit (or housing) 12 with a graphic user interface (GUI) 14 mounted generally centrally in the upper surface of the base unit 12. The GUI 14 is in electrical communication with control electronics 16 housed in the base unit 12. A sequence of language symbols 18 and a language-symbol selector 20 having a sight 22 are provided. The sequence of language symbols 18 and the language-symbol selector 20 are movable in relation to one another such that each language symbols of the sequence of language symbols 18 may be viewable in the sight 22.

The sequence of language symbols 18 may comprise two or more of the twenty-six letters of the English alphabet. Preferably the sequence of language symbols 18 includes all the letters of the English alphabet arranged alphabetically as pairs of upper and lower case representations of each letter (e.g., Aa-Zz). The sequence of language symbols 18 may comprise alternate arrangements of letters, or other selectable indicia or graphics. The alternate arrangements may be only upper case letters, only lower case letters, sequences of letters spelling words or word syllables, random sequences of letters or graphics or icons. The alternate arrangements also may include numerals or punctuation symbols (e.g., an exclamation point or a question mark). The sequence of language symbols 18 is not restricted to symbols associated with the English alphabet and may include any writable symbol associated with any language.

In the writing device 10, the sequence of language symbols 18 preferably appears on a rotatable ring 24 that surrounds the graphic user interface 14 and that is rotatably attached to the housing 12. The language-symbol selector 20 preferably is positioned proximal to the top of the GUI 14 and to the rotatable ring 24 such that each of the language symbols passes under the sight 22 as the ring 24 is rotated. Alternatively, the language-symbol selector 20 may be positioned adjacent the rotatable ring 24 anywhere along the circumference of the ring 24. The language-symbol selector 20 is operatively coupled to a selector switch 26 such that the identity of the language symbol in the sight 22 may be communicated to the control electronics 16 by touching or pressing the selector switch 26 when a desired language symbol is viewable in the sight 22. The selector switch 26 may be any well known switch including, but not limited to, a pressure sensitive or touch sensitive switch.

Figure 5:
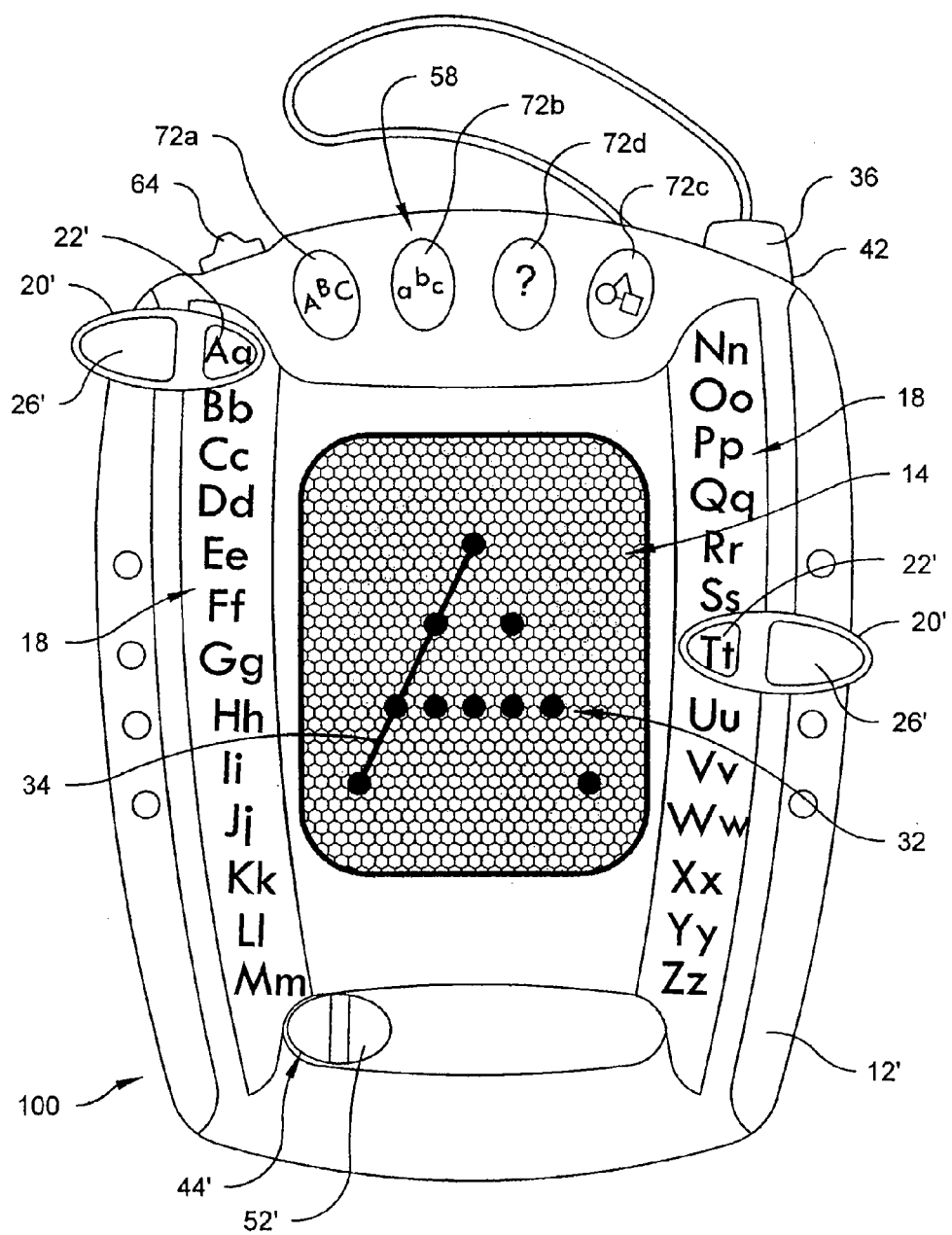
FIG. 5 is a plan view of a second preferred embodiment of an electronic learning device in accordance with the present invention.

Referring to FIG. 5, in a second preferred embodiment of the electronic learning device with a graphic user interface for interactive writing, generally designated 100, and hereinafter referred to as the "writing device" 100 in accordance with the present invention, the sequence of languages symbols 18 is in a fixed position on the housing (or base unit) 12'. The sequence of languages symbols 18 may comprise the twenty-six letters of the English alphabet and may be arranged such that the first thirteen letters (A-M) arranged alphabetically as pairs of upper and lower case representations of each letter (Aa-Mm) appear on the base unit 12' adjacent the left side of the GUI 14. The second (or remaining) thirteen letters of the alphabet (N-Z), similarly arranged, may appear on the base unit 12' adjacent the right side of the GUI 14. Alternate arrangements of letters, or other selectable indicia or graphics, on the left and right sides of the GUI 14 may appear on the base unit 12'.

The language-symbol selectors 20' of the writing device 100 are movable in relation to the fixed position of the sequence of language symbols 18. The language-symbol selector 20' preferably is slideably attached to the left and right sides of the base unit 12'. The language-symbol selectors 20' have a sight 22' and a selector switch 26'. The language-symbol selectors 20' are configured to allow the sight 22' to pass over the language symbols as the language-symbol selectors 20' slide along the side of the base unit 12'. The selector switch 26' is in electrical communication with the base unit control electronics 16. Selection of a desired language symbol is achieved by slideably positioning the sight 22' over the desired language symbol and communicating the selection to the base unit control electronics 16 by touching or pressing the selector switch 26'.

Figure 6A:
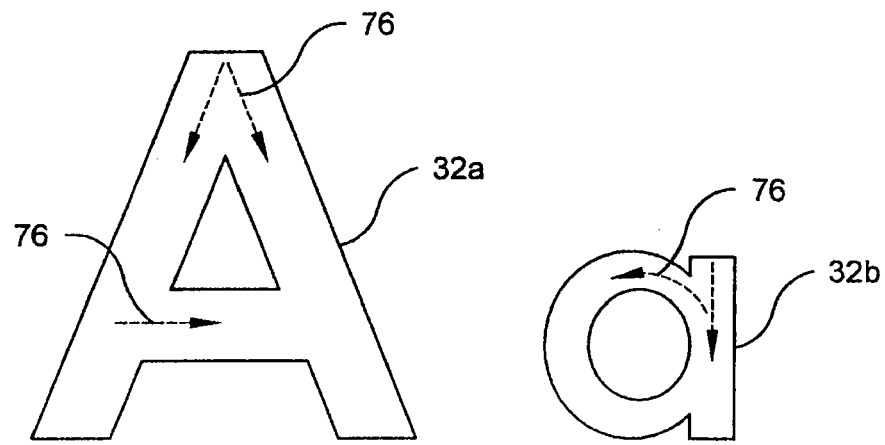
FIGS. 6a and 6b are examples of the ZANER-BLOSER® method and the D'NEALIAN® method for writing an upper case "A" and a lower case "a"
Figure 6B:
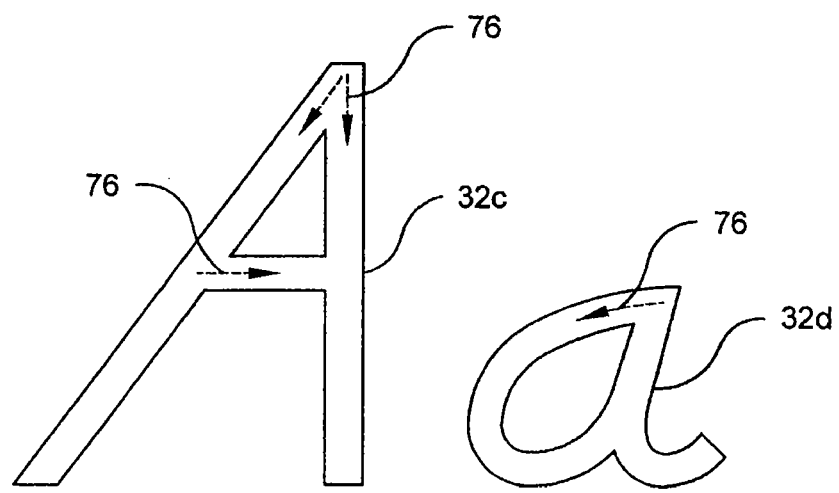

The control electronics 16 for both the writing device 10 and the writing device 100 are substantially the same and comprise a controller 28 and an electronic memory 30 having stored therein a plurality of traceable templates 32. Each traceable template 32 represents one language symbol of the sequence of language-symbol 18. The plurality of traceable templates 32 may depict the ZANER-BLOSER® form for letter writing, such as the ZANER-BLOSER® upper case letter "A" 32a and the ZANER-BLOSER® lower case letter "a" 32b shown in FIG. 6a. Alternatively, the plurality of traceable templates 32 may depict any other known font and corresponding method of construction, such as a D'NEALIAN® upper case letter "A" 32c and a D'NEALIAN® lower case letter "a" 32d shown in FIG. 6b.

The control electronics 16 is operatively coupled to the language-symbol selector 20, 20' and to the graphic user interface 14. The selection of one language symbol of the sequence of language symbols 18 when the one language symbol is viewable in the sight 22, 22' causes the GUI 14 to produce the traceable template 32 corresponding to the one language symbol and to produce a visible rendering 34 of a movement of an affector 36 as the affector 36 traces the traceable template 32.

Figure 3A:
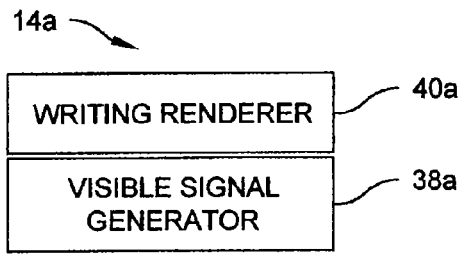
FIGS. 3a, 3b, 3c, and 3d are alternative embodiments of the graphic user interface for the electronic learning device of FIG. 1.

Referring to FIG. 3a, a first preferred embodiment of the GUI 14, hereafter referred to as the GUI 14a is shown. The GUI 14a comprises a visible signal generator 38a and a writing renderer 40a. The visible signal generator 38a underlies the writing renderer 40a. The visible signal generator 38a is configured to produce the traceable template 32 and the writing renderer 40a is configured to produce the visible rendering 34.

The visible signal generator 38a is in electrical communication with the controller 28 (FIG. 2). Under control of the controller 28, the visible signal generator 38a produces for tracing one of the traceable templates 32. The visible signal generator 38a may be a light emitting diode (LED) matrix and associated control electronics, such as the LED matrix disclosed in U.S. Pat. No. 6,486,860 (Eschbach) incorporated herein by reference. Alternatively, the visible signal generator 38a may be any processor controllable illuminator able to produce the traceable templates 32.

The writing renderer 40a is not electrically coupled to the base unit control electronics 16. The writing renderer 40a provides the visual rendering 34 of a user's efforts to move the affector 36 to trace the traceable template 32 or to create a freestyle graphic or letter. The writing renderer 40a may be any magnetophoretic display device. For example, the writing renderer 40a may including a magnetic panel such as the panel disclosed in U.S. Pat. No. 4,143,472 (Murata et al.) incorporated herein by reference.

Briefly, the Murata et al. a magnetophoretic device comprises a dispersing liquid with magnetic particles sealed in a space between two opposed transparent substrates. A stylus or pen having a magnetized tip is used to form a rendering of a writing by causing the magnetic particles to migrate to the front of the panel. An erasing magnet, slideably disposed at the rear of the panel is provided to erase the writing.

Referring to FIGS. 1, 3a and 5, the affector 36 for use with the GUI 14a for the writing devices 10, 100 is magnetically coupleable to the magnetophoretic display. The affector 36 may be a stylus with a magnetized tip (not shown). The stylus, preferably but not necessarily, is tethered to the base unit 12, 12' and may be removably inserted in a stylus slot 42 in the base unit 12, 12' when not in use.

Figure 4:
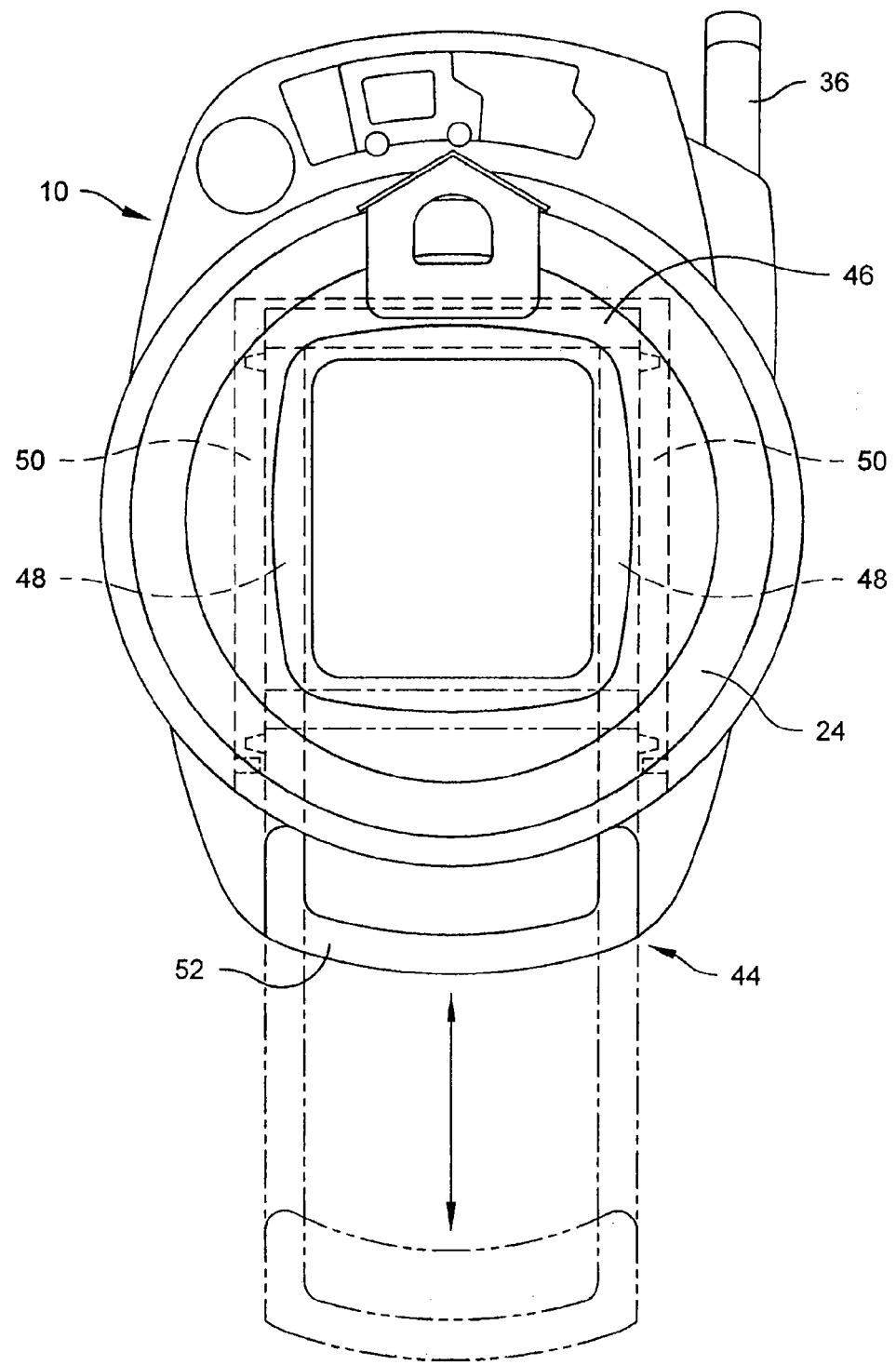
FIG. 4 is a plan view partially in phantom of the eraser assembly of the electronic learning device of FIG. 1.

Referring to FIGS. 1 and 4, an eraser bar assembly 44 is provided for erasing the visible rendering 34 produced by the magnetophoretic display. The eraser bar assembly 44 comprises a magnetic bar eraser 46 attached to one end of a pair of parallel, spaced-apart beams 48 that ride within tracks 50 in the lower case of the housing. An eraser bar handle 52 is attached to the other end of the pair of spaced apart beams 48. The handle 52 is located below the rotatable ring 24 and is graspable by the user. As the handle 52 is pulled away from the rotatable ring 24, the spaced-apart beams 48 slide along the track 50, drawing the magnetic bar eraser 46 from a resting position above the top edge of the display screen along the rear surface of the display screen to the bottom edge of the screen to erase whatever has been drawn on the screen. The magnetic bar eraser 46 is releasably held in the resting position by the interaction between a detent in the track and a corresponding protrusion in one of the beams to which the magnetic bar eraser 46 is attached. Alternatively, the magnetic bar eraser 46 may be releasable retained in the resting position by any well known spring biasing mechanism or releasable latch.

In an alternate embodiment of the eraser bar assembly 44' (see FIG. 5), the eraser bar assembly 44' is configured to move the magnetic bar eraser across the magnetophoretic display as the handle 52' is slideably moved between left to right positions in a slot at the bottom of the housing 12'.

Figure 3B:
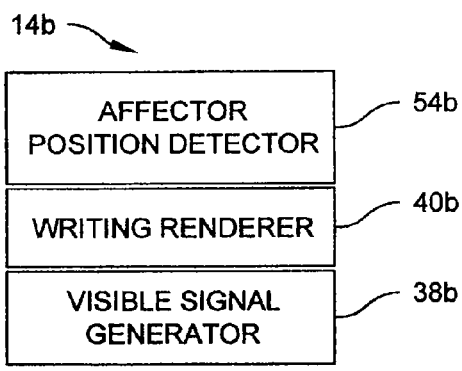

Referring to FIG. 3b, a second preferred embodiment of the GUI 14, hereafter referred to as the GUI 14b, is shown. The GUI 14b comprises a visible signal generator 38b, a writing renderer 40b, and an affector position detector 54b. The visible signal generator 38b and the writing renderer 40b are substantially the same as the visible signal generator 38a and the writing renderer 40a discussed above and for brevity are not further discussed. The affector 36 for use with the GUI 14b also is substantially the same as the affector 36 for use with the GUI 14a discussed above. The visible signal generator 38b underlies the writing renderer 40b and the affector position detector 54 overlies the writing renderer 40b. The affector position detector 54b is configured to communicate to the control electronics 16 the position of the affector 36 as the affector 36 traces the traceable template 32.

The affector position detector 54b may be any digitizer such as a pressure-sensitive system or a position-sensitive system or a pressure-sensitive and position-sensitive system that may employ, for example, semiconductive sensing, capacitive sensing, electrostatic sensing, membrane sensing, electromagnetic sensing, or resistive sensing to detect the presence and position of the affector 36 in contact with or proximal to the surface of the GUI 14b. The affector position detector 54b provides to the base unit control electronics 16 the locations through which the affector 36 passes to produce the visible rendering 34 in the writing renderer 40.

Figure 3C:
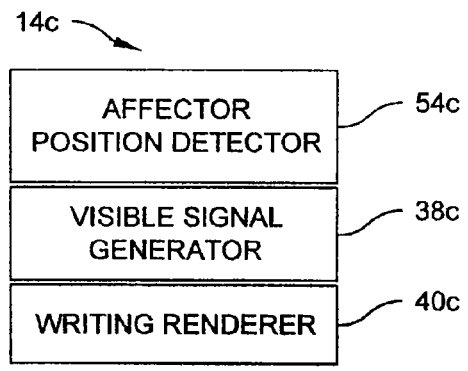

Referring to FIG. 3c, a third preferred embodiment of the GUI 14, hereafter referred to as the GUI 14c, is shown. The GUI 14c comprises a visible signal generator 38c, a writing renderer 40c, and an affector position detector 54c. The affector position detector 54c is substantially the same as the affector position detector 54b discussed above. The visible signal generator 38c is positioned between the affector position detector 54c and the writing renderer 40c.

The writing renderer 40c is in electrical communication with the base unit control electronics 16 and is preferably a print media with electronic ink, such as the electronic reusable paper system disclosed in U.S. Pat. No. 6,573,880 (Simoni et al.). Those skilled in the art will understand from the teachings of Simoni et al. that the affector 36 need not be magnetically coupled to the writing renderer 40c and that a stroke of the affector 36 may be rendered on the print media of Simoni et al. or any other print media with electronic ink based on the signals received from the affector position detector 54c.

The visible signal generator 38c may be a transparent organic light emitting device (TOLED), such as the TOLED disclosed in U.S. Pat. No. 6,639,357 (Parthasarathy et al.). Operating under the control of the base unit control electronics 16. Alternatively, the visible signal generator 38c may be any display device having a surface that is capable of producing a depiction of the traceable templates 32 and that is sufficiently transparent to permit viewing of the underlying visible rendering 34.

Figure 3D:
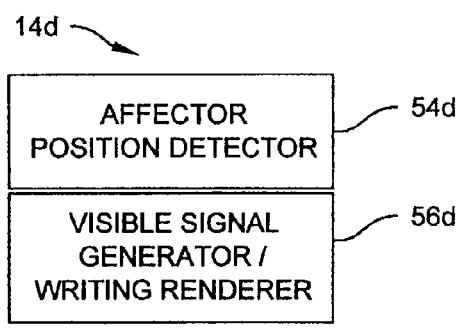

Referring to FIG. 3d, a fourth preferred embodiment of the GUI 14, hereafter referred to as the GUI 14d, is shown. The GUI 14d comprises a display device 56d and an affector position detector 54d. The affector position detector 54d overlays the display device 56d. The affector position detector 54d is substantially the same as the affector position detector 54b discussed above. The display device 56d may comprise a liquid crystal display ("LCD") or any display configured to superimpose the visible rendering 34 over the traceable template 32 in response to control signals from the base unit controller 28. The affector position detector 54d and the display device 56d may be separate units. Alternatively, the affector position detector 54d and the display device 56d may be an integral unit such as the touch screen device disclosed in U.S. Pat. No. 6,642,458 (Panagrossi III et al.) incorporated herein by reference or may be any display capable of performing substantially the same function. In accordance with the teachings of Panagrossi III et al., the display device 56d displays the traceable template 32 on a LCD and displays as an overlay the visible rendering 34 of the strokes made by the affector 36 as the affector 36 moves across the touch sensitive surface of the Panagrossi III et al. device.

Referring to FIG. 2, the controller 28 of base unit control electronics 16, in addition to being in electrical communication with the language-symbol selector 20 and one or more components of the GUI 14, also is in electrical communication with a mode selector 58, a speech synthesizer 60, an audible signal generator 62, and an On/Off/Volume Control switch 64 (FIG. 5). The electronic memory 30, in addition to storing the traceable templates 32, stores a plurality of selectable preprogrammed modes of interaction 72. A removable cartridge 66 may be provided for insertion in the base unit 12 to enhance the capability of the electronic memory 30. The removable cartridge 66 has cartridge memory 68 and may or may not have a cartridge microcontroller 70 that is slaveable to the base unit controller 28 when the cartridge 66 is inserted in the base unit 12, 12'.

One mode of the plurality of selectable preprogrammed modes of interaction 72 may be Uppercase mode 72a in which the control electronics 16 is configured to cause the visible signal generator 38a, 38b, 38c or the display device 56d to produce as the traceable template 32 an uppercase representation of one of the language symbols 18 and to cause the audio signal generator 62 to produce as an audible prompt instructions for writing the one language symbol. In Uppercase mode, for the selected language symbol, a traceable template 32 forming the uppercase representation of the selected language symbol is produced by the visible signal generator 38a, 38b, 38c or the display device 56d. The template 32 may be an arrangement of red circles (or any other desired geometric shape), produced by an LED array as shown in FIGS. 1 and 5. The circles may flash in a sequence representing the direction the user should move the affector 36 to cause the writing renderer 40a, 40b, 40c or the display device 56d to produce a rendering of the language symbol 18. Alternatively, or in addition, the visible signal generator 38a, 38b, 38c or the display device 56d may produce a glyph 76, such as directional arrows (see, FIG. 6a), as an additional writing aid.

Another mode of the plurality of selectable preprogrammed modes of interaction 72 may be Lowercase mode 72b in which the control electronics 16 is configured to cause the visible signal generator 38a, 38b, 38c or the display device 56d to produce as the traceable template 32 a lowercase representation of one of the language symbols 18 and to cause the audio signal generator 62 to produce as an audible prompt instructions for writing the one language symbol. In a manner similar to Uppercase mode 72a, in Lowercase mode a traceable template 32 for writing the lower case representation of the selected letter is produced by the visible signal generator 38a, 38b, 38c or the display device 56d.

An audio prompt or instruction for writing a language symbol also may be provided in either Uppercase or Lowercase modes 72a, 72b. For example, a prompt for the writing of a lowercase "a" could be "circle back (or counter clockwise) all the way around; push straight up; pull straight down".

Another mode of the plurality of selectable preprogrammed modes of interaction 72 is Drawing mode 72c. In Drawing mode 72c, the control electronics 16 is configured to cause the visible signal generator 38a, 38b, 38c or the display device 56d to produce as the traceable template 32 basic geometric shapes and other graphics, pictures or objects. The control electronics may cause the audio signal generator 62 to produce as an audible prompt an instruction for the user regarding how to trace the template 32. Additionally, the control electronics 16 may provide audio prompts for freestyle drawing without a template.

Another mode of the plurality of selectable preprogrammed modes of interaction 72 is Quiz mode 72d in which the control electronics 16 is configured to initiate language symbol based game play in which the user may be audibly prompted to use the language-symbol selector 20 to find a specific language symbol. The prompt may take various forms, such as "find the letter that starts the word 'cat'," or "find the letter that comes before the letter 'C'," or "find the letter that comes after the letter 'C'." Upon making a correct selection, the traceable template 32 for writing the language symbol may be produced by the visible signal generator 38a, 38b, 38c or the display device 56d. The audio signal generator 63 may produce as an audible prompt instructions for writing the one language symbol. Alternatively, the user may be audibly prompted to find the letter produced by the GUI 14 by using the letter selector 28 to select the corresponding letter on the base unit 12, 12'.

The four modes (Uppercase, Lowercase, Drawing, and Quiz) disclosed above are not meant to be limiting. Other modes of interaction may be scripted and provided in the base unit electronic memory 30 or in the cartridge memory 68 of the removable cartridge 66. For example, after the prompt is given in the Quiz mode 72d, if the visible signal generator comprises an LED array, the diodes that form the language symbol template may light one at a time, in stroke order, and function as a timer. The user must find and select the language symbol before all the symbol's lights are lit.

A mode selector 58 is provided on the base unit 12 to allow the user to select one mode of the plurality of selectable preprogrammed modes of interaction 72. Referring to FIG. 1, the mode selector 58 may be a multi-position slider switch configured to communicate to the control electronics 16 the selection of a mode of interaction by being moved until a mode icon corresponding to the desired mode appears in a window of the slider switch. Alternatively, referring to FIG. 5, the mode selector 58 may be an arrangement of button switches, each corresponding to a particular mode of operation.

Referring to FIGS. 2, 7a, and 7b, if the writing device 10, 100 has a GUI 14 with an affector position detector 54b, 54c, 54d (FIGS. 3b, 3c, 3d), the electronic memory 30 may have stored therein a rendering analyzer 74 and the control electronics 16 may be configured to activate the rendering analyzer 74 when the visible rendering 34 is produced. The rendering analyzer 74 comprises instructions that upon execution by the controller 28 enables the writing device 10, 100 to determine, based on the signals received from the affector position detector 54b, 54c, 54d, whether the visible rendering 34 is consistent with the traceable template 32 produced by the visible signal generator 20 and to provide feedback to the user. The feedback may be a positive acknowledgement if the visible rendering 34 is substantially the same as the traceable template 32. The feedback also may take the form of appropriate additional prompts as further guidance to the user if the visible rendering 34 deviates from the traceable template 32. Additionally, the rendering analyzer 74 may enable the writing system 10, 100 to evaluate the performance of the user and to increase or decrease the level of difficulty by presenting easier or harder templates 32 for the user to trace.

The instructions and data comprising the rendering analyzer 74 may be based on any of a wide variety of methods for either recognizing or evaluating a visible rendering, and, in particular, the writing of a language symbol with respect to template or reference. A preferred method upon which the instructions and data for the rendering analyzer 74 may be based is a critical point method 74a. Referring to FIG. 7a, a critical point template 78 for the language symbol "A" is defined by a set of critical points 78a, 78b, 78c, 78d, 78e. The critical point template 78 consists of three strokes. The first stroke 80 is defined by the critical points 78a and 78c, with the optional point 78b along its path. The second stroke 82 is defined by the critical points 78a and 78e, with the optional point 78d along its path. The third stroke 84 is defined by the critical points 78b and 78d with no optional points along its path. Recognition and evaluation of a visible rendering 86 of the critical point template 78 is accomplished by detecting that the affector 36 has passed through each of the critical points 78a, 78b, 78c, 78d, 78e and an analysis of the order of detection.

In general, in the critical point method, the order in which the strokes are made and the direction in which each stroke is made may not be important as any permutation of the stroke order and the direction of the strokes will produce a tracing that corresponds to the critical point template 78. However, if the writing objective is to trace the critical point template 78 in accordance with the rules of a particular writing method, such as the Zaner-Bloser method, the order of the strokes 80, 82, 84 and the direction the strokes are made is important and is included in the evaluation criteria of the rendering analyzer 74.

An alternate method upon which the instructions and data comprising the rendering analyzer 74 may be based is the percent area method. Referring to FIG. 7b, a percent area template 88 for the language symbol "A" is defined as a gutter 90 surrounding the first, second, and third stroke lines 80, 82, 84. The gutter 90 is divided into a plurality of areas, such as the area 90a. Recognition and evaluation of a visible rendering 92 of the percent area template 88 is accomplished by calculating the percent of each area 90a of the plurality of areas covered by the visible rendering 92. For example, a valid area for a visible rendering of the percent area template 88 for the language symbol "A" is any area 90a within the gutter 90. To successfully trace the percent area template 88 a predetermined percentage (e.g., 90%) of the areas 90a must be covered.

Figure 7C:
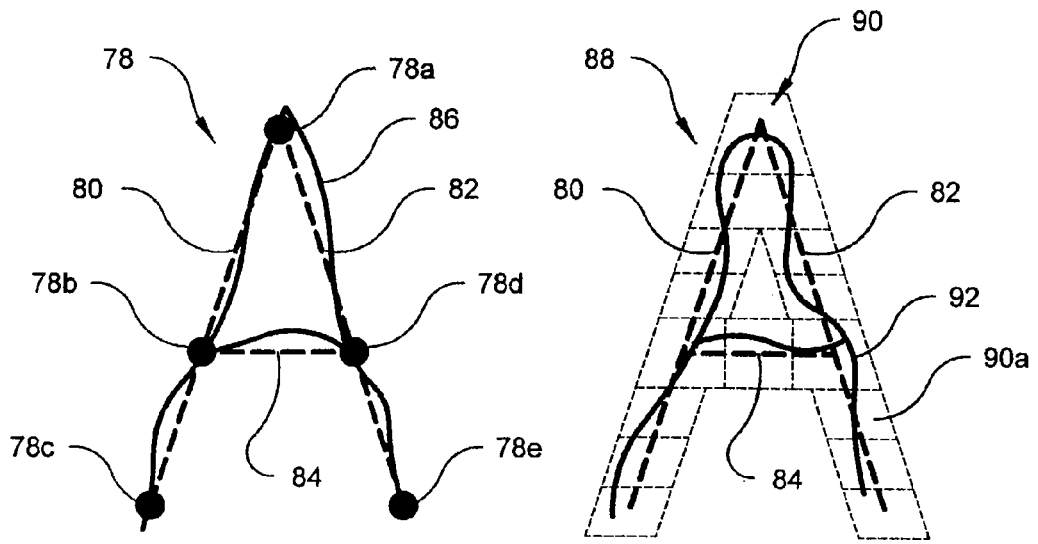
Figure 7C:
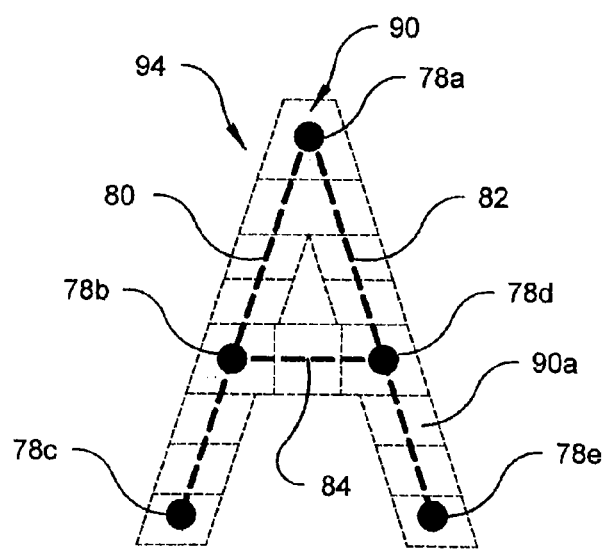

Referring to FIG. 7c, the percent area method (FIG. 7a) may be combined with the critical point method (FIG. 7a) as represented by the percent area with critical points template 94. The recognition and evaluation of a visible rendering in the percent area with critical points method is based on a determination that the visible rendering corresponding to the strokes of the percent area with critical point template 94 includes each area having one of the critical points and also requires that the visible rendering include a predetermined percentage of the remaining areas 90a.

The rendering analyzer 74 is not limited to the critical point method or the percent area method or the combination of the two. The writing device 10, 100 may prompt the user to produce a visible rendering of a language symbol without the aid of a traceable template produced by the visible signal generator 38a, 38b, 38c or the display device 56d. Ordered sets of data points corresponding to the shape and direction of construction of the visible rendering as determined by the affector position detector 54b, 54c, 54d may be collected and compared to the shape and direction of construction information for each of the traceable templates 32 in the electronic memory 30 to determine a best fit template for the user constructed language symbol. Various scoring methods, such as determining as a cumulative error the deviation of each set of data points corresponding to the shape of the visible rendering from the corresponding points for each of the plurality of language symbol templates in the electronic memory 30 as set forth in U.S. Pat. No. 6,111,976 (Rylander), incorporated herein by reference, may be used for the aforementioned determination.

Those skilled in the art will appreciate that changes could be made to the embodiments described above without departing from the broad inventive concept thereof. Therefore, the electronic learning device with a graphic user interface for interactive writing is not limited to the particular embodiments disclosed, but it is intended to cover modifications within the spirit and scope of the present invention as defined by the appended claims.

All references, patent applications, and patents mentioned above are incorporated herein by reference in their entirety and are not to be construed as an admission that any of the of the cited documents constitutes prior art, nor as an admission against interest in any manner.

We claim:

1. An interactive electronic device comprising:
  a sequence of physical language symbols;
  a language-symbol selector having a sight, the sequence of physical language symbols and the language-symbol selector movable in relation to one another such that each physical language symbol of the sequence of physical language symbols is viewable in the sight;
  a graphic user interface; and
  control electronics comprising an electronic memory having stored therein a plurality of traceable templates, each traceable template representing one physical language symbol of the sequence of physical language symbols, the control electronics operatively coupled to the language-symbol selector and to the graphic user interface,
  wherein using the language-symbol selector having a sight, selection of the one physical language symbol of the sequence of physical language symbols, when the one physical language symbol is viewable in the sight, causes the graphic user interface to produce the traceable template corresponding to the one physical language symbol and to produce a visible rendering of a movement of an affector as the affector traces the traceable template.

2. The interactive electronic device according to claim 1, wherein the graphic user interface comprises a visible signal generator configured to produce the traceable template and writing renderer configured to produce the visible rendering, the visible signal generator underlying the writing renderer.

3. The interactive electronic device according to claim 2, wherein the visible signal generator is a light emitting diode array, the writing renderer is a magnetophoretic display, and the affector is magnetically coupleable to the magnetophoretic display.

4. The interactive electronic device according to claim 1, wherein the graphic user interface comprises a visible signal generator configured to produce the traceable template, a writing renderer configured to produce the visible rendering, and an affector position detector configured to communicate to the control electronics the position of the affector as the affector traces the traceable template, the visible signal generator underlying the writing renderer, the affector position detector overlying the writing renderer.

5. The interactive electronic device according to claim 4, wherein the visible signal generator comprises a light emitting diode array, the writing renderer comprises a magnetophoretic display, the affector comprises a stylus magnetically coupleable to the magnetophoretic display, and the affector position detector comprises pressure or position sensitive array.

6. The interactive electronic device according to claim 1, wherein the graphic user interface comprises a visible signal generator configured to produce the traceable template, a writing renderer configured to produce the visible rendering, and an affector position detector configured to communicate to the control electronics the position of the affector as the affector traces the traceable template, the visible signal generator positioned between the affector position detector and the writing renderer.

7. The interactive electronic device according to claim 6, wherein the writing rendered comprises a print media with electronic ink, the visible signal generator comprises a transparent organic light emitting device, and the affector position detector is a pressure or position sensitive device.

8. The interactive electronic device according to claim 1, wherein the graphic user interface comprises a display device configured to superimpose the visible rendering over the traceable template and an affector position detector configured to communicate to the control electronics the position of the affector as the affector traces the traceable template, the affector position detector overlying the display device.

9. The interactive electronic device according to claim 8, wherein the display device comprises a liquid crystal display and the affector position detector is touch sensitive surface.

10. The interactive electronic device according to claim 1, wherein the electronic memory has stored therein a rendering analyzer and the control electronics is configured to activate the rendering analyzer when the visible rendering is produced.

11. The interactive electronic device according to claim 10, wherein the rendering analyzer comprises a critical point method.

12. The interactive electronic device according to claim 1, wherein the sequence of physical language symbols is on a rotatable ring surrounding the graphic user interface and the language-symbol selector is pivotably attached to a housing supporting the rotatable ring and the graphic user interface.

13. The interactive electronic device according to claim 1, wherein the sequence of physical language symbols is in a fixed position and the language-symbol selector is movable in relation to the fixed position.

14. The interactive electronic device according to claim 1, wherein the electronic memory has stored therein a plurality of selectable preprogrammed modes of interaction and the control electronics comprises a mode selector, an audible signal generator, and a speech synthesizer, the control electronics configured to operate in one mode of the plurality of selectable preprogrammed modes of interaction.

15. The interactive electronic device according to claim 14, wherein one mode of the plurality of selectable preprogrammed modes of interaction is uppercase mode in which the control electronics is configured to cause the visible signal generator to produce as the traceable template an uppercase representation of the one physical language symbol and to cause the audio signal generator to produce as an audible prompt instructions for writing the one physical language symbol.

16. The interactive electronic device according to claim 15, wherein one mode of the plurality of selectable preprogrammed modes of interaction is find mode in which the control electronics is configured to cause the audio signal generator to produce as an audible prompt instructions for using the language-symbol selector to find the physical language symbol and upon finding the physical language symbol to cause the visible signal generator to produce as the traceable template an uppercase representation of the physical language symbol.

* * * * *